J. R. Remington,
Stump Elevator.
N° 4,731.  Patented Sep. 3, 1846.
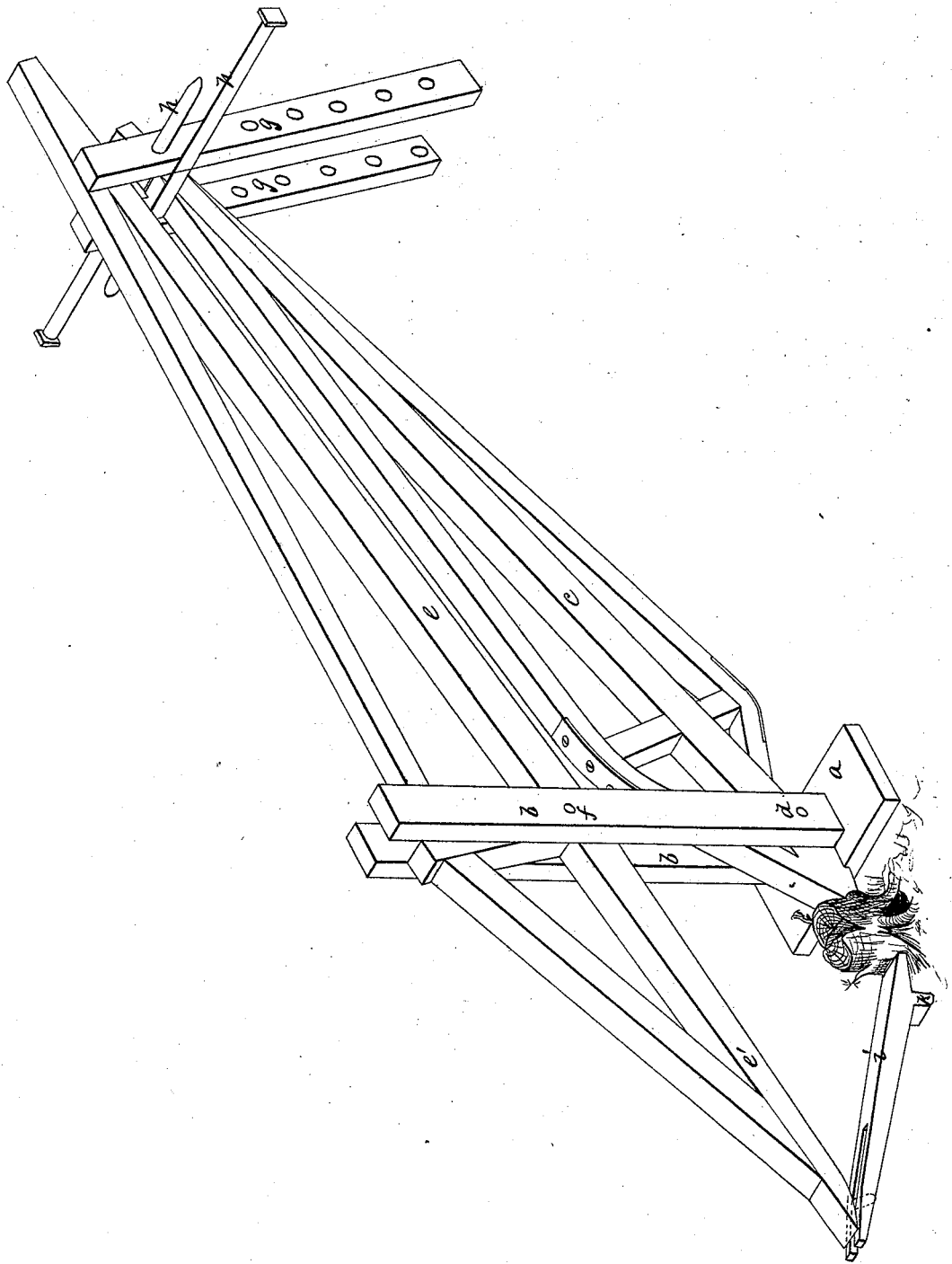

UNITED STATES PATENT OFFICE.

JOHN R. REMINGTON, OF LOWNDES COUNTY, ALABAMA.

STUMP-EXTRACTOR.

Specification of Letters Patent No. 4,731, dated September 3, 1846.

*To all whom it may concern:*

Be it known that I, JOHN R. REMINGTON, of Lowndes county, in the State of Alabama, have invented a new and useful Improvement in Machines for Extracting Stumps, and that the following is a full, clear, and exact description of the principle or character which distinguishes it from all other things before known, and of the manner of making, constructing, or using the same, reference being had to the accompanying drawing, making part of this specification, which is an isometrical view of the implement in operation.

The nature of my invention consists in the combination of levers, so arranged as to divide the downward pressure onto two fulcrums instead of one, to shorten the levers and increase their effect while the whole apparatus is made portable and can be conveniently transferred from one point to another.

The construction is as follows: From a base ($a$) formed of plank two standards ($b$) rise perpendicularly between which and near the bottom a braced lever ($c$) is placed having its fulcrum formed by a bolt ($d$) that passes through it and the standards. At a suitable distance above the lever ($c$) another lever ($e$) of similar construction is located, but this last named lever is made longer so that its short arm ($e'$) projects some distance beyond lever ($c$), (the fulcrum of lever ($e$) is at ($f$) in the standards). Near the end of the long arm of lever ($e$) two parallel pieces ($g$) of wood project downward on each side of the lever ($c$) below; these pieces ($g$) are not placed exactly opposite each other, and each has a row of holes in it,—they are so arranged that a handspike ($h$) can be placed in the holes made in either without interfering with the other, as clearly represented in the drawing; these are for the purpose of forcing the ends of the levers ($c$) and ($e$) apart when the apparatus is brought into action. The end of the short arm of lever ($e$) rests on the end of the long arm of a short lever ($i$) whose fulcrum ($k$) is placed on the ground on the side of the stump opposite the standard ($b$) and when the short arm of said lever and that of lever ($c$) are placed under the stump or in notches cut therein and in the position shown in the drawing by forcing the long arms of levers ($c$) and ($e$) apart the stump will be drawn out of the ground. The action of the lever ($e$) being opposed to the lever ($c$) which bears down on the standards much of the downward pressure is transferred from thence to the other side and by this combination a more effective and portable apparatus is made.

Having thus fully described my improvement, what I claim as my invention and desire to secure by Letters Patent is—

The combination of levers as herein described, constructed and operating substantially in the manner and for the purpose herein set forth.

JOHN R. REMINGTON.

Witnesses:
ROBERT BEALE,
HENRY JENKINS.